United States Patent [19]

Tabler

[11] 3,720,724

[45] March 13, 1973

[54] DEHYDROGENATION CYCLOHEXANE OR MONO- OR POLYALKYLCYCLOHEXANES

[75] Inventor: Donald C. Tabler, Bartlesville, Okla.

[73] Assignee: Phillips Petroleum Company, Bartlesville, Okla.

[22] Filed: June 3, 1970

[21] Appl. No.: 43,203

[52] U.S. Cl. ............260/668 D, 260/666 A, 252/464, 252/465
[51] Int. Cl. ................................................C07c 5/18
[58] Field of Search .........260/668 D, 666 A, 680 E, 260/680 R, 683.3; 252/465, 464

[56] References Cited

UNITED STATES PATENTS

| | | | |
|---|---|---|---|
| 3,551,470 | 12/1970 | Shaw et al. | 260/680 |
| 3,328,478 | 6/1967 | Barclay et al. | 260/680 |
| 3,159,688 | 12/1964 | Jennings et al. | 260/680 |
| 3,375,291 | 3/1968 | Callahan et al. | 260/680 |
| 2,904,580 | 9/1959 | Idol | 260/465.3 |

*Primary Examiner*—Curtis R. Davis
*Attorney*—Young and Quigg

[57] ABSTRACT

A method and catalyst for dehydrogenating cyclohexane and alkyl-substituted cyclohexanes to the corresponding aromatic compounds, the method involving contacting the cyclohexane or alkyl-substituted cyclohexane in the presence of hydrogen with a supported molybdenum-antimony catalyst.

6 Claims, No Drawings

DEHYDROGENATION CYCLOHEXANE OR MONO- OR POLYALKYLCYCLOHEXANES

This invention relates to the dehydrogenation of cyclohexane or a mono- or polyalkylcyclohexane.

In one of its more specific aspects, this invention relates to a catalyst and to a method of dehydrogenating cyclohexane or cyclohexane derivatives to the corresponding aromatic compounds. As used herein, the term "cyclohexane and derivatives" or "cyclohexane compound" includes cyclohexane and mono- and polyalkylcyclohexanes.

According to the method of this invention there is provided a process for dehydrogenating cyclohexane and derivatives to the corresponding aromatic compounds which comprises contacting the cyclohexane and/or derivatives with hydrogen and with an effective quantity of a catalyst comprising supported molybdenum and antimony under dehydrogenation conditions and recovering the aromatic compound.

According to this invention there is also supplied a catalyst suitable for the dehydrogenation of cyclohexane and derivatives to the corresponding aromatic compounds which comprises molybdenum and antimony supported on a nonacidic or mildly acidic substrate, said molybdenum being present in an amount from about 3 to about 15 weight percent of said total catalyst composition and said antimony being present in an amount from about 0.1 to about 10 moles per mole of molybdenum.

Accordingly, it is an object of this invention to provide a simple method of dehydrogenating cyclohexane and derivatives.

It is another object of this invention to provide an inexpensive dehydrogenation catalyst.

The method of this invention contemplates dehydrogenation of cyclohexanes to the corresponding aromatic compounds in accordance with the general formula

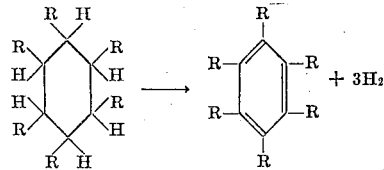

wherein R can be hydrogen or an alkyl group having up to about six carbon atoms per group and wherein as many as four R groups per molecule can be alkyl, preferably methyl.

Examples of cyclohexane derivatives which can be dehydrogenated include methylcyclohexane, cyclohexane, hexylcyclohexane, 2,2-dimethylbutylcyclohexane, 1,2,4,5-tetrahexylcyclohexane, 1,2,3,5-tetramethylcyclohexane, 1,3,5-trimethylcyclohexane, 1,4-diethylcyclohexane, 1,3-di(2-ethylbutyl)cyclohexane and the like.

Examples of aromatic compounds which can be produced according to this invention include benzene, toluene, hexylbenzene, 2,2-dimethylbutylbenzene, 1,2,4,5-tetrahexylbenzene, 1,2,3,5-tetramethylbenzene, 1,3,5-trimethylbenzene, 1,4-diethylbenzene, 1,3-di(2-ethylbutyl)benzene, 1,3-dimethylbenzene, and the like.

One of the applications of the invention is the dehydrogenation of methylcyclohexane to toluene.

The catalyst of this invention comprises molybdenum and antimony on a nonacidic or mildly acidic substrate. According to one presently preferred method, aqueous solutions of both molybdenum and antimony compounds are mixed with the substrate, and then contacted with a water-soluble, preferably volatilizable, base to adjust the pH to about neutral, after which the solution is evaporated to dryness. The residue is heated to a temperature in the range of 800° to 1,100° F. in the presence of an oxygen-containing atmosphere for about 1 to 10 hours, and then heated in the presence of a hydrogen-containing atmosphere at a temperature in the range of 700° to 1,000° F. for 1 to 24 hours, preferably with sufficient gas movement to sweep away any expelled water vapor. The dried material is then ground to about 10 to 35 U.S. mesh size, and employed in effective amounts as the catalyst.

The catalyst will comprise in the range of about 3 to about 15 weight percent molybdenum, preferably about 5 to 10 percent, with about 0.1 to about 10 moles, preferably 0.2 to about 1 mole, of antimony being incorporated in the catalyst per mole of molybdenum. Suitable substrates are alumina, magnesia, calcium aluminate, and the like, and their mixtures in the forms conventionally employed as catalyst supports.

The conversion can be conducted either batchwise or continuously by passing the hydrocarbon, in contact with hydrogen, and, simultaneously, the catalyst at elevated temperature and pressure.

The hydrocarbon feed is passed in contact with the catalyst at a rate of from about 0.5 to about 5 volumes of liquid hydrocarbon per hour per volume of catalyst, hydrogen being present upon contact with the catalyst in an amount from about 0.5 to about 10 moles of hydrogen per mole of cyclohexane compound. The reaction is maintained at a temperature of from about 600° F. to about 1,200° F., preferably from about 720° to 1,000° F., and at a pressure from about 200 to about 1,500 psig., preferably from about 350 to about 800 psig. The hydrogen can be recovered from the reactor effluent and recycled, being reintroduced with the make-up hydrogen, the dehydrogenated product being recovered by any suitable separation means.

The following examples are illustrated of the preparation of the catalyst and of the method of this invention.

EXAMPLE I

A catalyst suitable for employment in the method of this invention, having a mole ratio of molybdenum to antimony of approximately 2 to 1 was prepared by adding 8 milliliters of $SbCl_5$ to 14.8 grams of $(NH_4)_6Mo_7O_{24} \cdot 4H_2O$ dissolved in 250 milliliters of water at about 0° C. This mixture was then blended with 70 grams of alumina, this alumina having a particle size in the order of 1 micron or less and being prepared by flame hydrolysis. It is commercially identified as Alon-C as manufactured by Cabot Corporation, Boston, Mass. To the resulting paste were added 33 milliliters of 28 percent aqueous $NH_4OH$ solution. The resulting mixture had a pH of 8.

The mixture was dried at room temperature and then heated to 600° F. in air at which temperature it was held for three hours after which it was held at 1,000° F. for one hour in air. The cooled solid was ground and screened to recover a 10–35 U.S. mesh material having a surface area of about 100 sq. meters/gm., a molybdenum content of 8.1 weight percent and an antimony content of 4.7 weight percent. The molybdenum-antimony mole ratio of this material was 2.2 to 1. The material was then heated at 800° F. at atmospheric pressure for 16 hours in an atmosphere of hydrogen charged and exhausted at 1 cubic foot per minute to produce active catalyst.

EXAMPLE II

The catalyst prepared in Example I was employed to dehydrogenate methylcyclohexane to toluene, 34.7 grams of the catalyst being employed as a packed bed down through which methylcyclohexane and hydrogen were passed, in two separate runs, under the conditions indicated below, the product being recovered and analyzed as indicated.

| Run No. | 1 | 2 |
|---|---|---|
| Hydrocarbon Feed Charge Rate, liquid hourly space velocity | 1.0 | 1.0 |
| Hydrogen Flow Rate, moles/mole hydrocarbon feed | 1.0 | 1.0 |
| Reaction Temperature, °F. | 708 | 788 |
| Reactor Pressure, psig. | 400 | 400 |
| Duration of Run, hours | 0.25 | 1.0 |
| Product Analysis, Wt. % | | |
| Methylcyclohexane | 97.94 | 49.94 |
| Toluene | 1.92 | 44.47 |
| Cyclohexane | — | 4.69 |
| Other | 0.14 | 0.91 |

The analyses presented above were made by periodic gas liquid chromatography of the reactor effluent.

The above data demonstrate the operability of the method and catalyst of this invention as applied to the dehydrogenation of a cyclohexane derivative to its respective substituted benzene compound. The difference in toluene yield in the runs is primarily due to the difference in operating temperatures employed.

It will be evident from the foregoing that various modifications can be made to the method of this invention. However, such are considered as being within the scope of the invention.

What is claimed is:

1. A method of dehydrogenating cyclohexane or a substituted cyclohexane having the formula

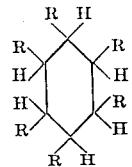

wherein R is hydrogen or an alkyl group having up to about six carbon atoms and wherein up to four R groups can be alkyl which comprises contacting said cyclohexane with hydrogen and with an effective quantity of a catalyst comprising supported molybdenum and antimony under dehydrogenating conditions and recovering the dehydrogenation product.

2. the e method of claim 1 in which said catalyst comprises from about 3 to about 15 weight percent molybdenum and about 0.1 to about 10 moles of antimony per mole of molybdenum.

3. The method of claim 2 in which methylcyclohexane is dehydrogenated to toluene by passing said methylcyclohexane and hydrogen in contact with said catalyst, said methylcyclohexane being passed in an amount of from about 0.5 to about 5 volumes of liquid methylcyclohexane per hour per volume of catalyst, and said hydrogen being passed in an amount from about 0.5 to about 10 moles of hydrogen per mole of cyclohexane at a temperature of about 600° F. to about 1,200° F. and at a pressure of from about 200 to about 1,500 psig.

4. The method of claim 1 in which methylcyclohexane is dehydrogenated to toluene by passing said methylcyclohexane in contact with a catalyst having a molybdenum content of 8.1 weight percent and an antimony content of 4.7 weight percent, said antimony and said molybdenum being deposited on alumina.

5. The method of claim 4 in which methylcyclohexane is dehydrogenated to toluene by passing methylcyclohexane in contact with said catalyst at a liquid hourly space velocity of 1, at a hydrogen flow rate of 1 mole per mole of methylcyclohexane, at a reaction temperature of 788° F., a reactor pressure of 400 psig for a period of one hour.

6. The process of claim 1 in which said cyclohexane is contacted with hydrogen in a quantity in excess of that quantity of hydrogen produced during the dehydrogenation of said cyclohexane derivative.

* * * * *